United States Patent [19]

Johnson

[11] Patent Number: 4,692,846

[45] Date of Patent: Sep. 8, 1987

[54] BATTERY HOLDER FOR COIN TYPE BATTERIES

[75] Inventor: Randall Johnson, 222 Avery La., No. 3, Los Gatos, Calif. 95030

[73] Assignees: Deborah Donkerbrook; Ronald Carstersen; Gail Carstersen; Randall Johnson, all of Los Gatos, Calif.

[21] Appl. No.: 902,612

[22] Filed: Sep. 2, 1986

[51] Int. Cl.[4] ........................ F21L 15/08; H01M 2/10

[52] U.S. Cl. ........................ 362/104; 429/97; 429/98; 362/201; 362/800

[58] Field of Search ........................ 429/96, 97, 98, 99, 429/100, 123; 362/103, 104, 109, 116, 201, 800, 806

[56] References Cited

U.S. PATENT DOCUMENTS

| | | | |
|---|---|---|---|
| 3,181,974 | 5/1965 | Barbera | 429/100 |
| 4,237,525 | 12/1980 | Deter | 362/800 |
| 4,271,457 | 6/1981 | Martin | 362/104 |
| 4,337,504 | 6/1982 | Simpson | 362/800 |

*Primary Examiner*—Donald L. Walton

*Attorney, Agent, or Firm*—Flehr, Hohbach, Test, Albritton & Herbert

[57] ABSTRACT

A battery holder for use in conjunction with a coin type battery carries an electric element having a pair of leads extending radially of the inner surface of the holder. One of the leads is considerably longer than the other and extends to the edge of the holder and then turns axially along the inner surface of the rim of the holder so as to engage the side edge of a coin battery when inserted. A substantial portion of the remainder of this lead is covered by insulation material so as to prevent contact with other portions of the coin battery. The other lead from the electric element engages a terminal of opposite polarity of the coin type battery when the coin type battery is properly inserted so as to switch the electric element to an "ON" state. Reversal of the battery orientation switches the element "OFF".

5 Claims, 6 Drawing Figures

FIG_1
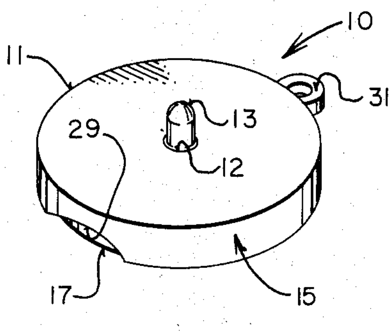
FIG_2
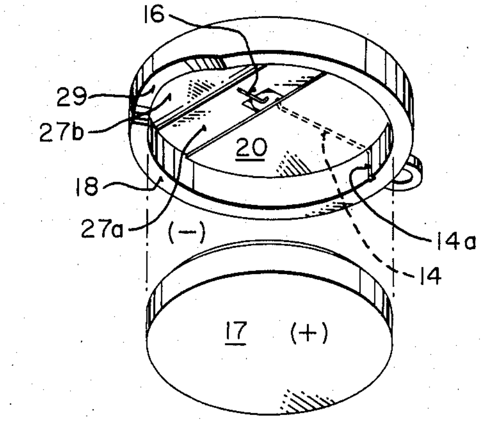
FIG_3
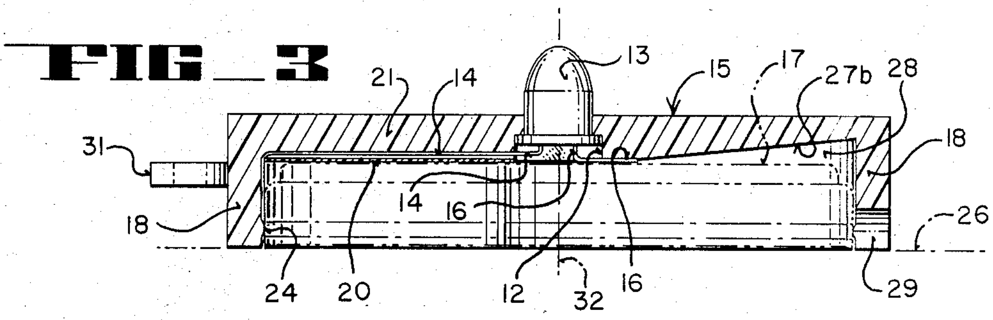
FIG_4A
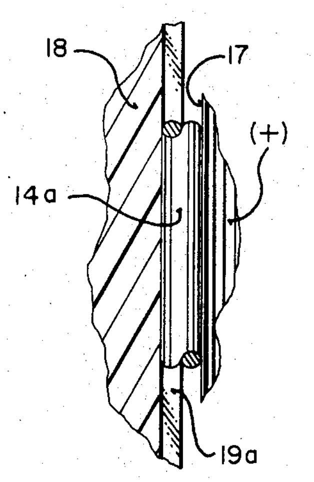
FIG_4
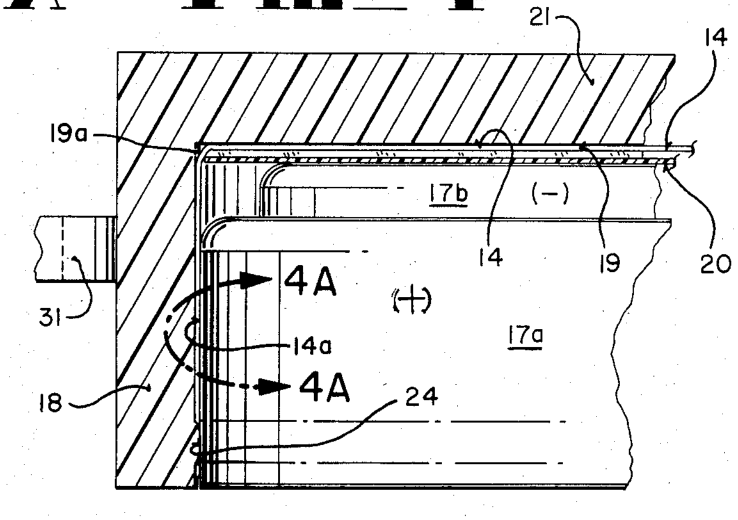
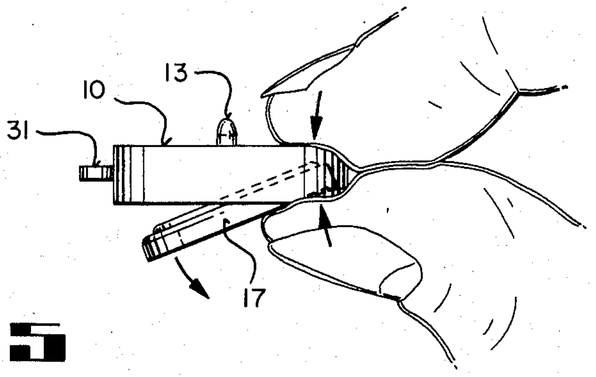
FIG_5

BATTERY HOLDER FOR COIN TYPE BATTERIES

This invention pertains to a battery holder for use with coin type batteries and is particularly useful in conjunction with operation of electric elements disposed perpendicular to the plane of the coin type battery without requiring additional intermediate circuitry.

Various types of holders for containing coin type batteries have been employed since the initial appearance of these flat, round batteries. Prior holders typically include the presence of a firmly closed cover whereby access to the battery is possible but not necessarily quick enough to be readily convenient.

Thus, in certain applications requiring an extremely low power/current drain, such as in a wristwatch, the battery can remain in place and "ON" for extended periods of time before requiring replacement. When access to the battery is required on such an infrequent basis, the manner of capturing the battery poses little or no inconvenience to the user.

However, where an article, such as electronic jewelry, employs an electrically operated element imposing greater power/current drain on the battery, the battery will quickly require replacement if the element cannot be easily turned "OFF". Usually, the introduction of ON/OFF switches simply adds to the cost of making devices operated bya coin type battery or otherwise.

Thus, there has been a need for a coin type battery holder wherein the battery can be simply, easily and quickly removed, turned over and reinstalled thereby turning the battery control circuit "OFF" until needed, while conveniently storing the battery until it is needed.

SUMMARY OF THE INVENTION AND OBJECTS

In general, a battery holder for use with a coin type battery includes a receptacle for receiving the battery therein. The receptacle includes a wall and annular rim protruding substantially normally away from one side face of the wall. A socket formed in the wall is adapted to hold an electric device therein of a type having first and second leads. One of the leads lies beneath insulation and extends radially to the inner face of the rim of the receptacle. The outer end portion of the lead extends coaxially along the inner face of the rim while the other lead lies exposed to extend a short radial distance from the socket toward the rim. Thus, upon insertion of a battery, the outer edge of the batter contacts the first lead and one face of the battery will contact the second lead. In a device where the holder is associated with an electric device which is essentially a unidirectional current device in which it will become energized by the flow of current in only one direction, the electric element can be "switched off" by removal of the battery, turning it over and reinstalling it into the holder.

In general, it is an object of the present invention to provide a novel and simplified battery holder for use in conjunction with a coin type battery.

It is another object of the present invention to provide a battery holder of the kind described wherein the battery can be readily removed from the holder, turned over and reinstalled.

It is a further object of the inventio to provide an article employing a unidirectional current element carried on one side of a battery holder and a coin type battery carried on the other side, mounted for making appropriate connections to the unidirectional current element.

It is yet another object of the invention to provide an article of jewelry employing a battery holder of the kind described and a unidirectional current element protruding normally from the battery to the opposite side of the holder.

The foregoing and other objects of the invention will become more readily evident from the following detailed description of a preferred embodiment when considered in conjunction with the drawings.

BRIEF DESCRIPTION OF THE DRAWINGS

FIG. 1 shows a diagrammatic perspective view of an article of jewelry employing an electrically activated element and battery holder according to the invention;

FIG. 2 shows a diagrammatic exploded perspective view, as viewed from below, of a battery holder and coin type battery associated therewith;

FIG. 3 shows a diagrammatic elevation centerline section view of a battery holder according to the invention;

FIG. 4 shows an enlarged detail view of a portion of the unit shown in FIG. 3;

FIG. 4A shows an enlarged elevation detail view taken along the line 4A—4A of FIG. 4; and FIG. 5 shows a diagrammatic elevation view of the manner for removal of a battery from the article shown in FIG. 1.

DETAILED DESCRIPTION OF PREFERRED EMBODIMENT

While the invention herein has more than one application, a preferred application, as described below, pertains to the provision of an article of electronic jewelry such as an earring or charm for attachment to a charm bracelet.

Accordingly, as shown in FIG. 1, an earring 10 includes a housing 11 of semi-rigid material such as plastic. Housing 11 includes a central opening 12 forming a portion of a socket for receiving an electric element 13, such as an LED having a pair of connecting leads 14, 16 thereto and characterized by a unidirectional polarity whereby lead 14 must be positive and lead 16 negative in order to activate LED 13.

The underside of housing 11 forms a receptacle for receiving a coin type battery 17 therein. The underside of the receptacle includes an annular rim 18 protruding substantially normally away from the side face of the wall on the underside of the receptacle.

Lead 14 lies in a slot 19 formed in one side face of wall 21 and includes a portion extending radially from socket opening 12 to rim 18. Slot 19 includes a continuation portion 19*a* which extends substantially normal to the plane of the side face of wall 21 carrying lead 14 and includes a portion 14*a* of lead 14 lying in slot 19*a*. Slot 19 has a depth substantially equal to or greater than the diameter of lead 14, however, slot 19*a* has a depth substantially less than the diameter of lead portion 14*a* whereby lead portion 14*a* will be forced to make contact with the edge of battery 17. Thus lead 14 lies in the radial slot 19 as well as in slot 19*a* continuing in the inner surface of the rim.

A layer 20 of insulation having a thickness on the order of heavy paper overlies the radial portion of lead 14 in order to maintain the radial portion of lead 14 insulated from battery 17 when inserted. Lead 16, however, lies exposed on the undersurface of wall 21 in order to make contact with battery 17.

As is known, coin type batteries include a positive and negative side which can be referred to as positive and negative "terminals." The positive terminal typically wraps around the side edge of the battery to include a positive edge **17*a* as part of the terminal. Accordingly, the negative terminal 17*b* engages lead 16 while the positive terminal 17*a* engages lead portion 14*a***.

By making lead **14*a* somewhat larger than the depth of its associated groove 19*a*, lead 14*a* will protrude slightly into the space to be occupied by battery 17. Accordingly, when battery 17 is inserted into the receptacle as shown, lead 14*a*** will apply a lateral binding pressure to assist in retaining the battery in its receptacle.

In addition to the above, a slightly protruding rib 24 extends about and within the inner end edge margin of rim 18. Rib 24 also serves to assist in retaining battery 17 in its associated receptacle.

As thus arranged, the positive side wall **17*a* of battery 17 engages lead 14*a* to apply a positive voltage thereto. Lead 14, accordingly, provides a positive voltage to LED 13. The other side of LED 13 connects to the negative "side" or terminal of battery 17 via lead 16. Accordingly, LED 13 is activated in this orientation of battery 17. LED 13 can be simply turned off by removing and replacing battery 17 in a reverse orientation. Thus, a battery holder as described above includes a cup-shaped receptacle for receiving the battery. The receptacle includes a wall portion and an annular rim 18 protruding substantailly normally away from one side of the wall portion. The edge of rim 18** lies generally in a plane.

The surface of wall 21 bounded by rim 18 includes first and second surface portions **27*a*, 27*b*. Surface portion 27*a* lies in a plane spaced substantially parallel from the plane of the edge of rim 18 to a degree adapted to substantially correspond to the thickness of the coin battery so as to dispose a surface of battery 17 substantially in the plane 26 of the rims's edge. The second surface portion 27*b* lies in a plane disposed at an angle to the plane of the first surface portion 27*a* so as to taper radially outwardly away from the plane of the first surface portion 27*a*. In this manner, a recess 28 has been defined between surface portion 27*b* and battery 17. Means for simply and easily removing battery 17 from its associated holder or receptacle includes a cutout or an arcuate relief opening 29 formed in the underside of rim 18 at a peripheral location radially adjacent recess 28**.

Relief opening 29 and recess 28 are sufficiently deep to permit the diametrically opposite edge of battery 17 to be readily tipped partially out of the battery holder or receptacle by pinching the edge of the receptacle and battery between the thumb and forefinger in the region of relief opening 29, as shown in FIG. 5.

Finally, means for attaching earring 10 to permit it to dangle downardly, or to attach a charm to a charm bracelet as shown in FIG. 1 includes the eyelet 31 formed integrally with the body of battery holder or receptacle 15.

In addition to the above, and from the foregoing, it will be evident that the orientation of the electric element 13 to the coin type battery serves to dispose the battery in a plane substantially normal to the axis 32 of element 13.

From the foregoing it will be readily evident that the manner of applying leads 14, 16 of an electric element having a unidirectional polarity takes advantage of the fact that with the battery inserted one way the element will be inactive whereas reversing the orientation of the battery will activate the element. Further, in either position the battery will be securely retained by an interference fit caused by the soft rib 24 defined around the interior lower end edge margin of rim 18, and the wedging effect produced by end portion **14*a* of lead 14**.

Further, it will be evident that the battery can be quickly removed by simply pinching the edge of the battery and holder in the region of the cutout or relief opening 29. Thus, by providing a recess 28 between the inner surface of the battery and wall 21, a space is provided into which the battery can be moved when it is so pinched.

I claim:

1. A battery holder for use with a coin type battery comprising a cup-shaped receptacle for receiving a coin-type battery, said receptacle having a wall and an annular rim protruding substantially normally away from one side face of said wall, a socket formed in said wall adapted to hold an electric device therein of a type having first and second leads coupled thereto, said leads having a predetermined diameter, a slot formed in said one side face to extend radially from said socket to said rim, said slot continuing substantially normal to said one side face in the inner surface of said rim, said radial slot having a depth substantially equal to or greater than said predetermined diameter, said first lead lying in said radial slot and in the slot continuing in the inner surface of said rim, said continuing slot having a depth substantially less than said predetermined diameter to cause a lead therein to be forced against the edge of a coin-type battery disposed within said socket, a layer of insulation covering that portion of said first lead lying in said one side face while leaving exposed that portion of said first lead continuing in the slot in the inner surface of said rim, said second lead lying exposed against said one side face of said wall whereby insertion of a coin type battery into said receptacle causes positive and negative portions of the battery to contact the exposed portions of said first and second leads.

2. An article employing a coin-type battery and holder threfor, said holder comprising a body formed of semirigid material, said holder being formed to include a cup-shaped receptacle for receiving the battery, said receptacle having a wall portion and an annular rim protruding substantially normally away from one side of said wall portion, the edge of said rim lying generally in a plane, the surface of said wall bounded by said rim having first and second surface portions, said first surface portion lying in a plane spaced substantially parallel from the plane of the edge of said rim to a degree adapted to substantially correspond to the thickness of a coin type battery so as to dispose a surface of said battery substantially in the plane of said edge, said second surface portion lying in a plane disposed at an angle to the plane of said first surface portion so as to taper radially outwardly away from the plane of said first surface portion to form a recess defined between said second surface portion and a coin-type battery disposed in said receptacle, an arcuate relief opening formed in said rim at a peripheral portion fo said rim radially adjacent said recess, said relief opening and said recess being sufficiently deep to permit a battery to be readily tipped partially out of said receptacle by pinching the edge of said receptacle and battery between the thumb and forefinger in the region of said relief opening.

3. An article comprising a battery holder as in claim 1 having an electric element carried in said socket, said first and second leads being coupled to said element, said element having a unidirectional polarity requiring a given one of said first and second leads to be coupled to positive voltage and another of said first and second leads coupled to negative voltage to activate said element, said battery, when disposed in a first orientation within said receptacle, serving to cause positive and negative terminals thereof to engage said first and second leads of said holder respectively so as to activate said element, and when disposed in a second orientation within said receptacle serving to cause the connections to be reversed thereby preventing operation of said element.

4. An article according to claim 3 in which said element comprises an LED.

5. An article according to claim 3 in which said element protrudes from said holder in a direction substantially normal to the plane of said coin-type battery.

* * * * *